United States Patent
Pisklak et al.

(10) Patent No.: US 12,129,425 B2
(45) Date of Patent: Oct. 29, 2024

(54) METHOD FOR ENHANCING REACTIVITY OF POZZOLANIC MATERIALS

(71) Applicant: Halliburton Energy Services, Inc., Houston, TX (US)

(72) Inventors: Thomas Jason Pisklak, Houston, TX (US); Samuel Jason Lewis, Houston, TX (US); Travis Allen Patterson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/490,073

(22) Filed: Oct. 19, 2023

(65) Prior Publication Data

US 2024/0067859 A1 Feb. 29, 2024

Related U.S. Application Data (62) Division of application No. 17/512,266, filed on Oct. 27, 2021, now Pat. No. 11,827,839.

(51) Int. Cl.
| | |
|---|---|
| *C09K 8/46* | (2006.01) |
| *C04B 28/04* | (2006.01) |
| *C04B 40/00* | (2006.01) |
| *E21B 33/14* | (2006.01) |

(52) U.S. Cl.
CPC ............ *C09K 8/46* (2013.01); *C04B 28/04* (2013.01); *C04B 40/0042* (2013.01); *C04B 40/0046* (2013.01); *E21B 33/14* (2013.01)

(58) Field of Classification Search
CPC ....... C09K 8/46; C04B 28/04; C04B 40/0042; C04B 40/0046; E21B 33/14
See application file for complete search history.

(56) References Cited

U.S. PATENT DOCUMENTS

| | | | |
|---|---|---|---|
| 3,798,191 A | 3/1974 | Donnelly | |
| 2017/0002257 A1* | 1/2017 | Pisklak | .......... C04B 28/34 |
| 2020/0317571 A1* | 10/2020 | MacDonald | ........ C04B 18/0481 |
| 2021/0253933 A1 | 8/2021 | Pisklak et al. | |

FOREIGN PATENT DOCUMENTS

| | | |
|---|---|---|
| EP | 1260491 | 11/2002 |
| WO | 2020-146551 | 7/2020 |

OTHER PUBLICATIONS

International Search Report and Written Opinion for Application No. PCT/US2022/037713, dated Oct. 31, 2022.
Office Action Summary for U.S. Appl. No. 17/512,266 dated Jun. 8, 2023.
Final Office Action Summary for U.S. Appl. No. 17/512,266 dated Jul. 14, 2023.

\* cited by examiner

*Primary Examiner* — Crystal J Lee
(74) *Attorney, Agent, or Firm* — Thomas Rooney; C. Tumey Law Group, PLLC (57) ABSTRACT

Preparing a cement slurry may include, mixing at least a raw pozzolan and a passivated cement solution, wherein the passivated cement solution comprising cement hydration products; reacting at least a portion of the raw pozzolan with the cement hydration products in the passivated cement solution to produce an activated pozzolan; drying the activated pozzolan; and blending the activated pozzolan with a cement.

20 Claims, 5 Drawing Sheets

METHOD FOR ENHANCING REACTIVITY OF POZZOLANIC MATERIALS

BACKGROUND

In well cementing, such as well construction and remedial cementing, cement slurries are commonly utilized. Cement slurries may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement slurry may be pumped into an annulus between the walls of the well bore and the exterior surface of the pipe string disposed therein. The cement slurry may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement slurries also may be used in remedial cementing methods, for example, to seal cracks or holes in pipe strings or cement sheaths, to seal highly permeable formation zones or fractures, to place a cement plug, and the like.

A particular challenge in wellbore cementing may be to ensure that cements have consistent and predictable properties. Pozzolans are used in cement slurry designs for multiple purposes such as yield enhancement, $CO_2$ footprint reduction, and increased mechanical properties, for example. However, pozzolans vary greatly in their reactivity with some being highly reactive and others having very low reactivity, and some may be inert in typical oilwell conditions. The variation in pozzolan reactivity may lead to variation in cement designs depending on what pozzolans are available. Field camp locations with highly reactive pozzolan sources can design slurries which have a much higher proportion of pozzolan, while those with low reactivity pozzolans are limited to low concentrations since these pozzolans do not contribute as much to strength development or other properties. Cement slurries prepared with pozzolans with relatively lower reactivity may not have the desired properties for oilwell cementing.

In the present disclosure, an activated pozzolan additive is disclosed which may be included in cement slurries for oilwell cementing. The present methods may utilize the activated pozzolan additive in the bulk mixing preparation of a dry cement blend. The dry cement blend may be transported to a well site and mixed with water to produce a cement slurry which may be introduced into a wellbore.

BRIEF DESCRIPTION OF THE DRAWINGS

These drawings illustrate certain aspects of some of the embodiments of the present disclosure and should not be used to limit or define the disclosure.

DETAILED DESCRIPTION

The present disclosure may generally relate to cementing methods and systems. More particularly, embodiments may be directed methods of preparing oilwell cement slurries from a dry cement blend which comprises an activated pozzolan.

As used herein, activated pozzolan refers to a raw pozzolanic material which has been surface modified by reacting the raw pozzolanic material in a passivated cement solution. The passivated cement solution may impart several properties to the surface of the raw pozzolanic material to form the activated pozzolan, including without limitation, surface etching, formation of microcrystalline calcium silica hydrate on the surface, dissolution of silicates to form more reactive silicate species, and others. The activated pozzolan has greater reactivity than the raw pozzolanic material the activated pozzolan is derived from thereby allowing the activated pozzolan to be utilized in a wider variety of cement designs than the corresponding raw pozzolanic material. The process described herein may be utilized to upgrade relatively lower reactivity pozzolans to relatively higher reactivity pozzolans thereby increasing the value of the lower reactivity pozzolan. Activated pozzolan may be included in a bulk dry cement blend. Cement dry blends may be prepared in bulk blending facilities where a cement, such as Portland cement, may be mixed with additives such as supplementary cementitious materials, chemical additives, inert additives, and the activated pozzolan. While there are many advantages to including the activated pozzolan in a wellbore cement slurry, a particular advantage may be reduction in greenhouse gas emissions as a portion of the cement may be replaced by activated pozzolan. Another advantage is that the mechanical properties of a set cement, such as compressive strength and Young's modulus, are increased by including the activated pozzolan as compared to a cement containing the raw pozzolanic material.

Pozzolans are typically classified as materials containing siliceous and/or aluminous materials which react with water and calcium hydroxide to form a set cement. Any suitable raw pozzolan may be utilized in the present application to produce activated pozzolan, including for example, fly ash, volcanic ash, tuft, pumicites, clays such as metakaolin, silica fume, slag, lime ash, perlite, and glass such as silicate glass, soda-lime glass, soda-silica glass, borosilicate glass, aluminosilicate glass, aplite, clays, and calcined clays. While the present list is of suitable raw pozzolans is non-exhaustive, it is believed that any pozzolan suitable for use in an oilwell cement is also suitable for the processes described herein to produce activated pozzolan. The raw pozzolan may have any particle size distribution and morphology. In certain embodiments, the pumice may have a d50 particle size distribution in a range of from about 1 micron to about 200 microns, or greater. The d50 values may be measured by particle size analyzers such as those manufactured by Malvern Instruments, Worcestershire, United Kingdom. In specific embodiments, the raw pozzolan may have a d50 particle size distribution in a range of from about 1 micron to about 200 microns, from about 5 microns to about 100 microns, or from about 10 microns to about 25 microns.

Preparing the activated pozzolan comprises preparing a passivated cement solution A passivated cement solution is a solution which contains cement and water in an amount such that the passivated cement solution does not set to form a hardened mass at 20° C. and 101.325 kPa when tested in a ultrasonic cement analyzer, operated in accordance with the procedure set forth in the aforementioned API RP Practice 10B-2. In wellbore cementing, water is added to a dry cement in an amount to produce a cement slurry with a desired density and in an amount such that the cement slurry will set to from a hardened mass with a desired compressive strength. In wellbore cementing, density is an important property when the cement is being pumped into the wellbore to ensure that sufficient pressure is exerted by the cement slurry and the well remains controlled. When the cement slurry sets, the compressive strength is an important property to ensure zonal isolation does not become compromised. Thus, there is a minimum amount of water to include which begins to hydrate cement grains and maximum practical amount of water that would be added to a dry cement blend when preparing a cement slurry for wellbore use to meet density and compressive strength requirement, among others. As more water is added to a cement slurry beyond what is required to hydrate the individual grains of cement, the cement grains begin to disperse in solution. The dispersive effects lower the inter-grain formation of cement hydration products thereby reducing the compressive strength of the set cement until there is enough water to separate the grains such that the solution does not set to form a hardened mass.

The passivated cement solutions of the present application are distinct from cement slurries prepared for use in wellbore or construction applications as the passivated cement solution contains water in an amount which prevents the passivated cement solution from setting to form a hardened mass. Cement slurries prepared for wellbore and construction cementing contain water in amounts that allow the cement slurry to set to form a hardened mass. In some examples, passivated cement solution may have a density close to that of water (1 kg/l). For example, the passivated cement solution may have a density from about 1 kg/l to about 1.2 kg/l. However, density of the passivated cement solution is dependent upon the amount of water required to form a solution which does not set to form a hardened mass. The amount of water required to form a solution that does not set may vary greatly between cements. While low density cements slurries do exist which have lower density than water, these cements slurries are usually formulated with light weight beads or a foaming surfactant and foaming gas which reduces the density below that of water. However, low density cements slurries still contain water in amounts that allow the cement to set to form a hardened mass and are distinct from the passivated cement solution which does not set.

Thickening time typically refers to the time a fluid, such as a cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In wellbore cementing, 70 Bc (Beardan units of consistency) is used as a cutoff for when a cement is considered too set to pump. The passivated cement solution as disclosed herein does not reach 70 Bc as the passivated cement solution does not set to form a hardened mass.

To form the passivated cement solution, water may be combined with a cement in an amount such that the cement grains are diluted and not capable of agglomerating to form a hardened mass. The amount of water required to prepare a passivated cement solution may depend on the type and origin of the cement used as cements may vary in the amount of water required to hydrate the cement grains. A wide variety of cements may be used to prepare the passivated cement solution such as, without limitation, Portland cements, pozzolana cements, gypsum cements, alumina cements, silica cements, and any combination thereof. The amount of water should be sufficient to dilute the water and cement mixture enough so that the particles of the cement material generally do not agglomerate and bind to each other, i.e. they remain discrete. An abundance of water should be used such that the particles of the cementitious material are not capable of agglomerating, for example the water may be used in an amount of about 400% by weight of the cementitious material to about 5000% by weight of the cementitious material or more. Alternatively, the water may be used in an amount of about 400% by weight of the cementitious material to about 1000% by weight of the cementitious material, about 1000% by weight of the cementitious material to about 2500% by weight of the cementitious material, about 2500% by weight of the cementitious material to about 5000% by weight of the cementitious material, or any ranges therebetween. In the Examples below, the water is present in about 1000% by weight of water.

The water may be provided in an amount such that particles of the cement material are able to not agglomerate. Agglomerated particles may be broken by shearing and suspension aids may be used to keep the particles from settling. After the water has been added to the cement the passivation process will commence. The mixture may need to react for a period, for example, of about 1 hours to about 24 hours. Alternatively, the mixture may be reacted for about 1 hour to about 2 hours, about 2 hours to about 5 hours, or about 5 hours to about 24 hours, or any ranges therebetween for example. The passivation process may be carried out at any temperature, for example temperatures ranging from about 5° C. to about 80° C. Alternatively, from about 5° C. to about 20° C., about 20° C. to about 60° C., about 60° C. to about 80° C., or any ranges therebetween. During the reaction phase, the mixture may to be stirred either continuously or intermittently or may be kept in a quiescent state. Any type of stifling or agitation may be used including magnetic stirrers and overhead stirrers for example. Additionally, a suspension agent, may be used to aid in suspending the cement particles. Use of the suspending agent may be in addition to or in substitution of agitation. Examples of suitable suspending aids may include viscosifiers, such as those described above which include swellable clays such as bentonite or biopolymers such as cellulose derivatives (e.g., hydroxyethyl cellulose, carboxymethyl cellulose, carboxymethyl hydroxyethyl cellulose). The passivation process may include many individual cementitious reactions, the cement hydration products of which may depend on the particular cement selected. With Portland cement, some cement hydration products may include a mixture of partially and fully reacted cement grains, C—S—H (calcium silicate hydrate) micro and/or nanoparticles, and a solution pH of greater than 7.

Once the passivated cement solution is prepared, a suitable raw pozzolan is added to the passivated cement solution. Raw pozzolans may include any described above, including but not limited to, fly ash, volcanic ash, tuft, pumicites, clays such as metakaolin, silica fume, slag, lime ash, perlite, and glass such as silicate glass, soda-lime glass, soda-silica glass, borosilicate glass, and aluminosilicate glass. The raw pozzolan may be added in any suitable amount including from about 100% by weight of cement in the passivated cement solution to about 2000% by weight of cement in the passivated cement solution. Alternatively, from about 100% by weight of cement in the passivated cement solution to about 500% by weight of cement in the passivated cement solution, from about 500% by weight of cement in the passivated cement solution to about 1000% by weight of cement in the passivated cement solution, from about 1000% by weight of cement in the passivated cement solution to about 2000% by weight of cement in the passivated cement solution, or any ranges therebetween. Once the raw pozzolans are added to the passivated cement solution, the cement hydration products in the passivated cement solution begin to react with the raw pozzolan to produce activated pozzolan.

The mixture may need to react for a period, for example, of about 1 hours to about 24 hours. Alternatively, the mixture may be reacted for about 1 hour to about 2 hours, about 2 hours to about 5 hours, about 5 hours to about 12 hours, about 12 hours to about 24 hours or any ranges therebetween for example. The reaction may be carried out at any temperature, for example temperatures ranging from about 5° C. to about 80° C. Alternatively, from about 5° C. to about 20° C., about 20° C. to about 60° C., about 60° C. to about 80° C., or any ranges therebetween. During the activation reaction phase, the mixture may to be stirred either continuously or intermittently or may be kept in a quiescent state, the mixture may to be stirred either continuously or intermittently or may be kept in a quiescent state. Additionally, a suspension agent, may be used to aid in suspending the raw pozzolan. Use of the suspending agent may be in addition to or in substitution of agitation. Examples of suitable suspending aids may include viscosifiers, such as those described above which include swellable clays such as bentonite or biopolymers such as cellulose derivatives (e.g., hydroxyethyl cellulose, carboxymethyl cellulose, carboxymethyl hydroxyethyl cellulose).

Activated pozzolan may undergo surface reactions in the passivated cement solution. Without being limited by theory, it is believed the passivated cement solution deposits calcium silicate hydrates and carbonates on the surface of the raw pozzolan which increases the reactivity of the raw pozzolan. The passivated cement solution may etch and dissolve the surface of the raw pozzolan to create soluble species and induce formation of nucleation sites on the raw pozzolan.

The product mixture from the activation reaction may include unreacted passivated cement solution, unreacted pozzolan, and activated pozzolan. The product mixture may be dried, granulated, and sieved, if desired. The dry activated pozzolan product produced from the drying step may be utilized in cement bulk blending as a dry additive. Cement dry blends may be prepared in bulk blending facilities where a cement, such as Portland cement, may be mixed with additives such as supplementary cementitious materials, chemical additives, inert additives, and the activated pozzolan. The cement dry blend may be transported to a wellbore location where the cement dry blend is mixed with water to form a cement slurry which is introduced into a wellbore.

Cement slurries described herein may generally include a hydraulic cement and water. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include, but are not limited to, Portland cements, pozzolana cements, gypsum cements, alumina cements, silica cements, and any combination thereof. In certain examples, the hydraulic cement may include a Portland cement. In some examples, the Portland cements may include Portland cements that are classified as Classes A, C, H, and G cements according to American Petroleum Institute, API Specification for Materials and Testing for Well Cements, API Specification 10, Fifth Ed., Jul. 1, 1990. In addition, hydraulic cements may include cements classified by American Society for Testing and Materials (ASTM) in C150 (Standard Specification for Portland Cement), C595 (Standard Specification for Blended Hydraulic Cement) or C1157 (Performance Specification for Hydraulic Cements) such as those cements classified as ASTM Type I, II, or III. The hydraulic cement may be included in the cement slurry in any amount suitable for a particular composition. Without limitation, the hydraulic cement may be included in the cement slurries in an amount in the range of from about 10% to about 80% by weight of dry blend in the cement slurry. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the cement slurries.

The water may be from any source provided that it does not contain an excess of compounds that may undesirably affect other components in the cement slurries. For example, a cement slurry may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the cement slurry in an amount in the range of from about 33% to about 200% by weight of the cementitious materials. For example, the water cement may be present in an amount ranging between any of and/or including any of about 33%, about 50%, about 75%, about 100%, about 125%, about 150%, about 175%, or about 200% by weight of the cementitious materials. The cementitious materials referenced may include all components which contribute to the compressive strength of the cement slurry such as the hydraulic cement and supplementary cementitious materials, for example.

As mentioned above, the cement slurry may include supplementary cementitious materials. The supplementary cementitious material may be any material that contributes to the desired properties of the cement slurry. Some supplementary cementitious materials may include, without limitation, fly ash, blast furnace slag, silica fume, pozzolans, kiln dust, and clays, for example.

The cement slurry may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. A cement kiln dust may be added to the cement slurry prior to, concurrently with, or after activation. Cement kiln dust may include a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The CKD and/or lime kiln dust may be included in examples of the cement slurry in an amount suitable for a particular application.

In some examples, the cement slurry may further include one or more of slag, natural glass, shale, amorphous silica, or metakaolin as a supplementary cementitious material. Slag is generally a granulated, blast furnace by-product from the production of cast iron including the oxidized impurities found in iron ore. The cement may further include shale. A variety of shales may be suitable, including those including silicon, aluminum, calcium, and/or magnesium. Examples of suitable shales include vitrified shale and/or calcined shale. In some examples, the cement slurry may further include amorphous silica as a supplementary cementitious material. Amorphous silica is a powder that may be included in embodiments to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process In some examples, the cement slurry may further include a variety of fly ashes as a supplementary cementitious material which may include fly ash classified as Class C, Class F, or Class N fly ash according to American Petroleum Institute, API Specification for Materials and Testing for Well Cements, API Specification 10, Fifth Ed., Jul. 1, 1990. In some examples, the cement slurry may further include zeolites as supplementary cementitious materials. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

Where used, one or more of the aforementioned supplementary cementitious materials may be present in the cement slurry. For example, without limitation, one or more supplementary cementitious materials may be present in an amount of about 0.1% to about 80% by weight of the cement slurry. For example, the supplementary cementitious materials may be present in an amount ranging between any of and/or including any of about 0.1%, about 10%, about 20%, about 30%, about 40%, about 50%, about 60%, about 70%, or about 80% by weight of the cement.

In some examples, the cement slurry may further include hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in examples of the cement slurry, for example, to form a hydraulic composition with the supplementary cementitious components. For example, the hydrated lime may be included in a supplementary cementitious material-to-hydrated-lime weight ratio of about 10:1 to about 1:1 or 3:1 to about 5:1. Where present, the hydrated lime may be included in the set cement slurry in an amount in the range of from about 10% to about 100% by weight of the cement slurry, for example. In some examples, the hydrated lime may be present in an amount ranging between any of and/or including any of about 10%, about 20%, about 40%, about 60%, about 80%, or about 100% by weight of the cement slurry. In some examples, the cementitious components present in the cement slurry may consist essentially of one or more supplementary cementitious materials and the hydrated lime. For example, the cementitious components may primarily comprise the supplementary cementitious materials and the hydrated lime without any additional components (e.g., Portland cement, fly ash, slag cement) that hydraulically set in the presence of water.

Lime may be present in the cement slurry in several; forms, including as calcium oxide and or calcium hydroxide or as a reaction product such as when Portland cement reacts with water. Alternatively, lime may be included in the cement slurry by amount of silica in the cement slurry. A cement slurry may be designed to have a target lime to silica weight ratio. The target lime to silica ratio may be a molar ratio, molal ratio, or any other equivalent way of expressing a relative amount of silica to lime. Any suitable target time to silica weight ratio may be selected including from about 10/90 lime to silica by weight to about 40/60 lime to silica by weight. Alternatively, about 10/90 lime to silica by weight to about 20/80 lime to silica by weight, about 20/80 lime to silica by weight to about 30/70 lime to silica by weight, or about 30/70 lime to silica by weight to about 40/63 lime to silica by weight.

Other additives suitable for use in subterranean cementing operations also may be included in embodiments of the cement slurry. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the cement slurry after storing but prior to the placement of a cement slurry into a subterranean formation. In some examples, the cement slurry may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the cement slurry in an amount in the range of from about 0.01% to about 5% by weight of the cementitious materials. In specific examples, the dispersant may be present in an amount ranging between any of and/or including any of about 0.01%, about 0.1%, about 0.5%, about 1%, about 2%, about 3%, about 4%, or about 5% by weight of the cementitious materials.

In some examples, the cement slurry may further include a set retarder. A broad variety of set retarders may be suitable for use in the cement slurries. For example, the set retarder may comprise phosphonic acids, such as ethylenediamine tetra(methylene phosphonic acid), diethylenetriamine penta (methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement slurry in an amount sufficient to delay the setting for a desired time. In some examples, the set retarder may be present in the cement slurry in an amount in the range of from about 0.01% to about 10% by weight of the cementitious materials. In specific examples, the set retarder may be present in an amount ranging between any of and/or including any of about 0.01%, about 0.1%, about 1%, about 2%, about 4%, about 6%, about 8%, or about 10% by weight of the cementitious materials.

In some examples, the cement slurry may further include an accelerator. A broad variety of accelerators may be suitable for use in the cement slurries. For example, the accelerator may include, but are not limited to, aluminum sulfate, alums, calcium chloride, calcium nitrate, calcium nitrite, calcium formate, calcium sulphoaluminate, calcium sulfate, gypsum-hemihydrate, sodium aluminate, sodium carbonate, sodium chloride, sodium silicate, sodium sulfate, ferric chloride, or a combination thereof. In some examples, the accelerators may be present in the cement slurry in an amount in the range of from about 0.01% to about 10% by weight of the cementitious materials. In specific examples, the accelerators may be present in an amount ranging between any of and/or including any of about 0.01%, about 0.1%, about 1%, about 2%, about 4%, about 6%, about 8%, or about 10% by weight of the cementitious materials.

Cement slurries generally should have a density suitable for a particular application. By way of example, the cement slurry may have a density in the range of from about 8 pounds per gallon ("ppg") (959 kg/m$^3$) to about 20 ppg (2397 kg/m$^3$), or about 8 ppg to about 12 ppg (1437, kg/m$^3$), or about 12 ppg to about 16 ppg (1917.22 kg/m$^3$), or about 16 ppg to about 20 ppg, or any ranges therebetween. Examples of the cement slurry may be foamed or unfoamed or may comprise other means to reduce their densities, such as hollow microspheres, low-density elastic beads, or other density-reducing additives known in the art.

Figure 1:
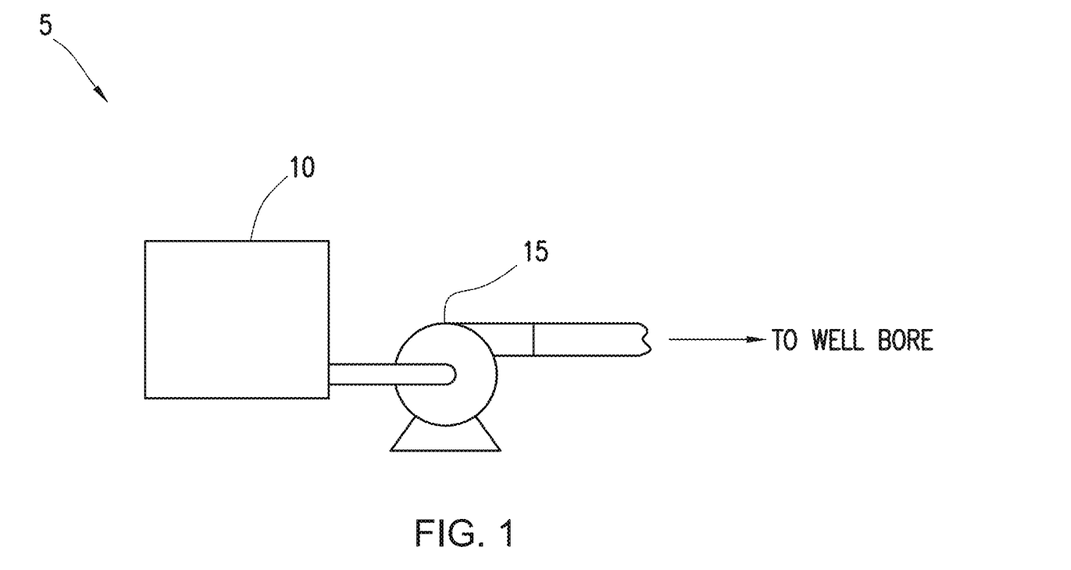
FIG. 1 is a schematic illustration of an example system for the preparation and delivery of a cement slurry to a wellbore.

FIG. 1 illustrates an example system 5 for preparation of a cement slurry including and delivery of the cement slurry to a wellbore. The cement slurry may be any cement slurry disclosed herein including those comprising an activated pozzolan. As shown, the cement slurry may be mixed in mixing equipment 10, such as a jet mixer, re-circulating mixer, or a batch mixer, for example, and then pumped via pumping equipment 15 to the wellbore. In some examples, the mixing equipment 10 and the pumping equipment 15 may be disposed on one or more cement trucks as will be apparent to those of ordinary skill in the art. In some examples, a jet mixer may be used, for example, to continuously mix a dry blend including the cement slurry, for example, with the water as it is being pumped to the wellbore.

Figure 2:
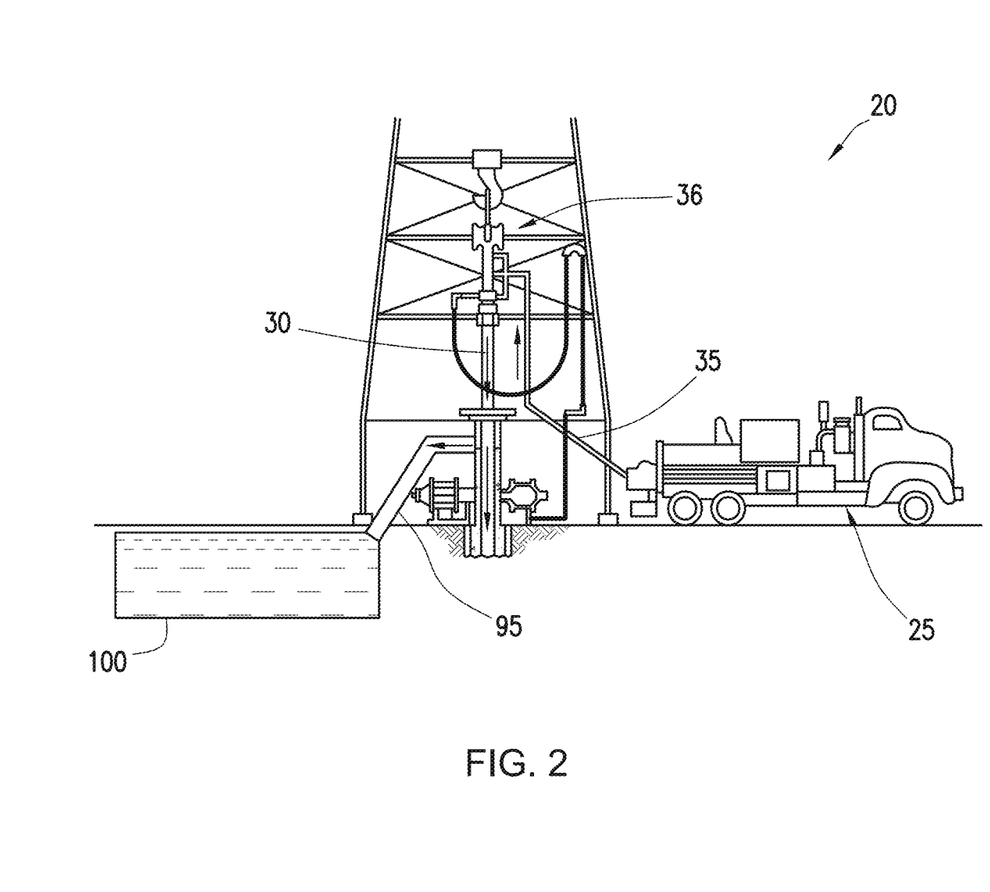
FIG. 2 is a schematic illustration of example surface equipment that may be used in the placement of a cement slurry in a wellbore.

An example technique for placing a cement slurry into a subterranean formation will now be described with reference to FIGS. 2 and 3. FIG. 2 illustrates example surface equipment 20 that may be used in placement of a cement slurry. The cement slurry may be any cement slurry disclosed herein. A cement slurry recipe be developed, for example, using the cement fluid loss models described herein, and a cement slurry may be prepared based on the cement slurry recipe. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 20 may include a cementing unit 25, which may include one or more cement trucks. The cementing unit 25 may include mixing equipment 10 and pumping equipment 15 (e.g., FIG. 1) as will be apparent to those of ordinary skill in the art. The cementing unit 25 may pump a cement slurry 30 through a feed pipe 35 and to a cementing head 36 which conveys the cement slurry 30 downhole.

Figure 3:
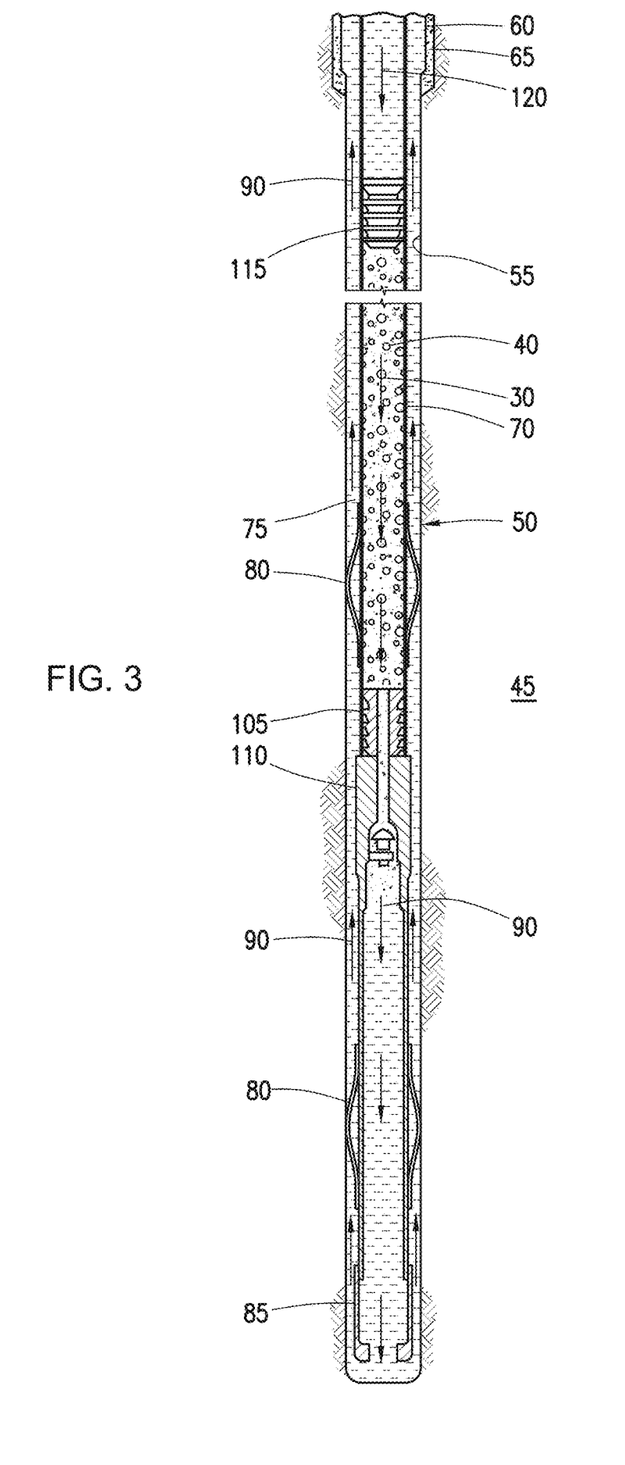
FIG. 3 is a schematic illustration of the example placement of a cement slurry into a wellbore annulus.

Turning now to FIG. 3, the cement slurry 30, may be placed into a subterranean formation 45. As illustrated, a wellbore 50 may be drilled into one or more subterranean formations 45. While the wellbore 50 is shown extending generally vertically into the one or more subterranean formation 45, the principles described herein are also applicable to wellbores that extend at an angle through the one or more subterranean formations 45, such as horizontal and slanted wellbores. As illustrated, the wellbore 50 includes walls 55. In the illustrated example, a surface casing 60 has been inserted into the wellbore 50. The surface casing 60 may be cemented to the walls 55 of the wellbore 50 by cement sheath 65. In the illustrated example, one or more additional conduits (e.g., intermediate casing, production casing, liners, etc.), shown here as casing 70 may also be disposed in the wellbore 50. As illustrated, there is a wellbore annulus 75 formed between the casing 70 and the walls 55 of the wellbore 50 and/or the surface casing 60. One or more centralizers 80 may be attached to the casing 70, for example, to centralize the casing 70 in the wellbore 50 prior to and during the cementing operation.

With continued reference to FIG. 3, the cement slurry 30 may be pumped down the interior of the casing 70. The cement slurry 30 may be allowed to flow down the interior of the casing 70 through the casing shoe 85 at the bottom of the casing 70 and up around the casing 70 into the wellbore annulus 75. The cement slurry 30 may be allowed to set in the wellbore annulus 75, for example, to form a cement sheath that supports and positions the casing 70 in the wellbore 50. While not illustrated, other techniques may also be utilized for introduction of the cement slurry 30. By way of example, reverse circulation techniques may be used that include introducing the cement slurry 30 into the subterranean formation 45 by way of the wellbore annulus 75 instead of through the casing 70.

As it is introduced, the cement slurry 30 may displace other fluids 90, such as drilling fluids and/or spacer fluids that may be present in the interior of the casing 70 and/or the wellbore annulus 75. At least a portion of the displaced fluids 90 may exit the wellbore annulus 75 via a flow line 95 and be deposited, for example, in one or more retention pits 100 (e.g., a mud pit), as shown on FIG. 2. Referring again to FIG. 3, a bottom plug 105 may be introduced into the wellbore 50 ahead of the cement slurry 30, for example, to separate the cement slurry 30 from the other fluids 90 that may be inside the casing 70 prior to cementing. After the bottom plug 105 reaches the landing collar 110, a diaphragm or other suitable device should rupture to allow the cement slurry 30 through the bottom plug 105. In FIG. 3, the bottom plug 105 is shown on the landing collar 110. In the illustrated example, a top plug 115 may be introduced into the wellbore 50 behind the cement slurry 30. The top plug 115 may separate the cement slurry 30 from a displacement fluid 120 and push the cement slurry 30 through the bottom plug 105.

The cement slurries disclosed herein may be used in a variety of subterranean applications, including primary and remedial cementing. The cement slurries may be introduced into a subterranean formation and allowed to set. In primary cementing applications, for example, the cement slurries may be introduced into the annular space between a conduit located in a wellbore and the walls of the wellbore (and/or a larger conduit in the wellbore), wherein the wellbore penetrates the subterranean formation. The cement slurry may be allowed to set in the annular space to form an annular sheath of hardened cement. The cement slurry may form a barrier that prevents the migration of fluids in the wellbore. The cement slurry may also, for example, support the conduit in the wellbore. In remedial cementing applications, the cement slurry may be used, for example, in squeeze cementing operations or in the placement of cement plugs. By way of example, the cement slurry may be placed in a wellbore to plug an opening (e.g., a void or crack) in the formation, in a gravel pack, in the conduit, in the cement sheath, and/or between the cement sheath and the conduit (e.g., a micro annulus), and/or in a reverse cementing application.

The following statements may describe certain embodiments of the disclosure but should be read to be limiting to any particular embodiment.

Statement 1. A method of cementing comprising: preparing a cement slurry by mixing at least water and a cement dry blend, wherein the cement dry blend comprises a cement and an activated pozzolan; and introducing the cement slurry into a wellbore penetrating a subterranean formation; and allowing the cement slurry to set to form a hardened mass.

Statement 2. The method of statement 1 wherein the cement comprises at least one selected from the group consisting of a Portland cement, a pozzolana cement, a gypsum cement, an alumina cement, a silica cements, and combinations thereof.

Statement 3. The method of any of statements 1-2 wherein the activated pozzolan comprises cement hydration products deposited on a pozzolan, wherein the cementhydration products are reaction products of water and at least one cement selected from the group consisting of a Portland cement, a pozzolana cement, a gypsum cement, an alumina cement, a silica cements, and combinations thereof.

Statement 4. The method of any of statements 1-3 wherein the pozzolan is selected from the group consisting of fly ash, volcanic ash, tuft, pumicites, metakaolin, silica fume, slag, lime ash, perlite, silicate glass, soda-lime glass, soda-silica glass, borosilicate glass, aluminosilicate glass, aplite, clays, calcined clays, and combinations thereof.

Statement 5. The method of any of statements 1-4 wherein the cement hydration products comprise microcrystalline and/or nanocrystalline calcium silica hydrate.

Statement 6. The method of any of statements 1-5 wherein cement hydration products comprise carbonate.

Statement 7. A method of producing an activated pozzolan comprising: mixing at least a raw pozzolan and a passivated cement solution, wherein the passivated cement solution comprising cement hydration products; reacting at least a portion of the raw pozzolan with the cement hydration products in the passivated cement solution to produce an activated pozzolan; drying the activated pozzolan; and blending the activated pozzolan with a cement.

Statement 8. The method of statement 7 further comprising: mixing at least a second cement and water to form a pre-passivated cement solution, wherein the water is present in an amount such that the pre-passivated solution does not set to form a hardened mass; and reacting at least a portion of the second cement with the water to produce the passivated cement solution comprising the cement hydration products.

Statement 9. The method of any of statements 7-8 wherein the second cement comprises at least one selected from the group consisting of a Portland cement, a pozzolana cement, a gypsum cement, an alumina cement, a silica cements, and combinations thereof.

Statement 10. The method of any of statements 7-9 wherein the water is present in an amount of about 400% by weight of the second cement to about 5000% by weight of the second cement.

Statement 11. The method of any of statements 7-10 wherein the reacting the second cement with the water to produce the passivated cement solution is carried out at a temperature of about 5° C. to about 80° C.

Statement 12. The method of any of statements 7-11 wherein the reacting the second cement with the water to produce the passivated cement solution is carried out for about 1 hour to about 24 hours.

Statement 13. The method of any of statements 7-12 wherein the cement hydration products comprise microcrystalline and/or nanocrystalline calcium silica hydrate.

Statement 14. The method of any of statements 7-13 wherein cement hydration products comprise a carbonate.

Statement 15. The method of any of statements 7-14 wherein the cement hydration products comprise at least reacted cement grains.

Statement 16. The method of any of statements 7-15 wherein the raw pozzolan is selected from the group consisting of fly ash, volcanic ash, tuft, pumicites, metakaolin, silica fume, slag, lime ash, perlite, silicate glass, soda-lime glass, soda-silica glass, borosilicate glass, aluminosilicate glass, aplite, clays, calcined clays and combinations thereof.

Statement 17. The method of any of statements 7-16 wherein the cement comprises at least one selected from the group consisting of a Portland cement, a pozzolana cement, a gypsum cement, an alumina cement, a silica cements, and combinations thereof.

Statement 18. The method of any of statements 7-17 wherein the blending the activated pozzolan with a cement further comprises blending with at least of a supplementary cementitious material, a chemical additive, an inert additive.

Statement 19. A composition comprising: a cement; and an activated pozzolan, wherein the cement and the activated pozzolan are a dry mixed powder.

Statement 20. The composition of statement 19 wherein the activated pozzolan comprises cement hydration products disposed on a surface of a pozzolan, the cement hydration products comprising at least one hydration product selected from the group consisting of microcrystalline calcium silica hydrate, nanocrystalline calcium silica hydrate, a carbonate, fully reacted cement grains, partially reacted cement grains, and combinations thereof.

EXAMPLES

To facilitate a better understanding of the present disclosure, the following examples of certain aspects of some embodiments are given. In no way should the following examples be read to limit, or define, the entire scope of the disclosure.

Example 1

Cements were prepared using an activated pozzolan as described herein. Recycled glass was treated with the methods described to produce an activated pozzolan. The recycled glass used in this example was obtained as crushed particles from Strategic Materials, Inc with a measured particle size distribution $D_{50}$ of 80 microns, a measured specific gravity of 2.54, and a water requirement of 59.

To enhance pozzolanic activity of the recycled glass particles, the particles were treated by the following method. First a passivated cement slurry was formed by mixing 450.0 g water with 45.0 g Class G cement in a 1.0 liter bottle. The bottle containing the cement slurry was placed in a 160° F. oven to react the cement particles. After two hours the bottle was removed from the oven and 400.0 g of the recycled glass particles were added to the mixture and mixed. The bottle was placed back in the oven at 160° F. for two additional hours. The bottle was then removed from the oven and the contents poured into a 10" by 10" cake pan and placed in an oven at 190° F. for 24 hours to obtain a dry powder activated pozzolan.

Two cement slurries were prepared according to Table 1 and Table 2. The first cement slurry utilized the raw recycled glass powder as a pozzolanic additive and the second cement slurry utilized the activated pozzolan.

TABLE 1

| Material | Weight (g) | SG | Vol. (ml) | PPG |
|---|---|---|---|---|
| Texas Lehigh Type I | 64.8 | 3.2 | 20.1 | 13.9 |
| Raw Recycled Glass | 259.2 | 2.6 | 101.6 | |
| Water | 178.2 | 1 | 178.6 | |

TABLE 2

| Material | Weight (g) | SG | Vol. (ml) | PPG |
|---|---|---|---|---|
| Texas Lehigh Type I | 64.8 | 3.2 | 20.1 | 13.9 |
| Activated Pozzolan | 259.2 | 2.6 | 101.6 | |
| Water | 178.2 | 1 | 178.6 | |

The slurries from Table 1 and Table 2 equate to 80% by weight of dry blend recycled glass and 20% by weight of dry blend blend cement, and 55% water by weight of blend (bwob). Both slurries were mixed according to API specifications and placed in separate ultrasonic cement analyzers (UCAs) both at 140° F. and 3000 psi. After about 96 hours the set cement samples were removed from the UCA and crushed using a Tinius-Olsen load-frame. The crush value was then used to correct the UCA results, shown in FIG. 4. Table 3 shows the tabulated valued from crush corrected UCA.

TABLE 3

| Material | Time at 50 psi (hr) | Crush Corrected C.S. (psi) | | | |
|---|---|---|---|---|---|
| | | 24 hr | 48 hr | 72 hr | 96 hr |
| Raw Recycled Glass Cement | 5.18 | 196 | 465 | 556 | 581 |
| Activated Pozzolan | 4.37 | 252 | 664 | 910 | 957 |
| % Improvement | 15.6 | 28.6 | 42.8 | 63.7 | 64.7 |

Figure 4:
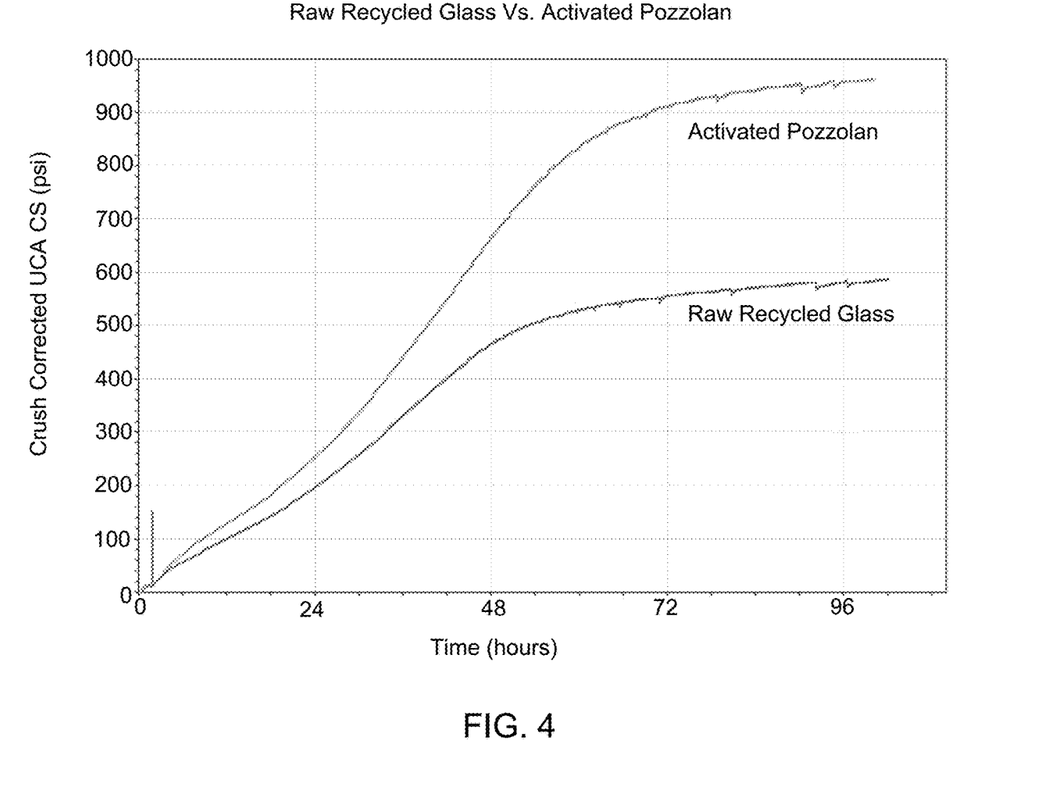
FIG. 4 is a graph of a crush corrected UCA of raw recycled glass versus activated pozzolan.

It can be observed from FIG. 4 and Table 3 that the slurry containing the activated pozzolan derived from raw recycled glass has a greater compressive strength than the slurry containing the raw recycled glass.

Example 2

Cements were prepared using an activated pozzolan as described herein. Perlite powder was treated with the methods described to produce an activated pozzolan. The perlite used in this example was from Imerys N. A., Inc, Inc and had a measured particle size distribution D50 of 16 microns, a measured specific gravity of 2.43, and a water requirement of 52.

To enhance pozzolanic activity of the perlite powder, the particles were treated by the following method. First a passivated cement slurry was formed by mixing 450.0 g water with 45.0 g Class G cement in a 1.0 liter bottle. The bottle containing cement slurry was placed in a 160° F. oven to react the cement particles. After two hours the bottle was removed from the oven and 400.0 g of the perlite powder was added to the mixture and mixed. The bottle was placed back in the over at 160° F. for two additional hours. The bottle was then removed from the oven and the contents poured into a 10" by 10" cake pan and placed in an oven at 190° F. for 24 hours to obtain a dry powdered activated pozzolan.

Two cement slurries were prepared according to Table 4 and Table 5. The first cement slurry utilized the raw perlite powder as a pozzolanic additive and the second cement slurry utilized the activated pozzolan produced from raw perlite.

TABLE 4

| Material | Weight (g) | SG | Vol. (ml) | PPG |
|---|---|---|---|---|
| Texas Lehigh Type I | 64.0 | 3.2 | 19.8 | 13.7 |
| Raw Perlite | 256.0 | 2.5 | 104.5 | |
| Water | 176 | 1 | 176.4 | |

TABLE 5

| Material | Weight (g) | SG | Vol. (ml) | PPG |
|---|---|---|---|---|
| Texas Lehigh Type I | 64.0 | 3.2 | 19.8 | 13.7 |
| Activated Pozzolan | 256.0 | 2.5 | 104.5 | |
| Water | 176 | 1 | 176.4 | |

The slurries from Table 4 and Table 5 equate to 80% by weight of dry blend perlite, 20% by weight of dry blend cement, and 55% by weight of blend (bwob). Both slurries were mixed according to API specifications and placed in separate UCAs both at 140° F. and 3000 psi. After about 96 hours the set cement samples were removed from the UCA and crushed using a Tinius-Olsen load-frame. The crush value was then used to correct the UCA results, shown in FIG. 5. Table 3 shows the tabulated valued from crush corrected UCA.

TABLE 6

| Material | Time at 50 psi (hr) | Crush Corrected C.S. (psi) | | | |
|---|---|---|---|---|---|
| | | 24 hr | 48 hr | 72 hr | 96 hr |
| Raw Perlite Cement | 2.50 | 882 | 932 | 950 | 954 |
| Activated Pozzolan Cement | 2.66 | 1456 | 1696 | 1800 | 1875 |
| % Improvement | −6.4 | 65.1 | 82.0 | 89.5 | 96.5 |

Figure 5:
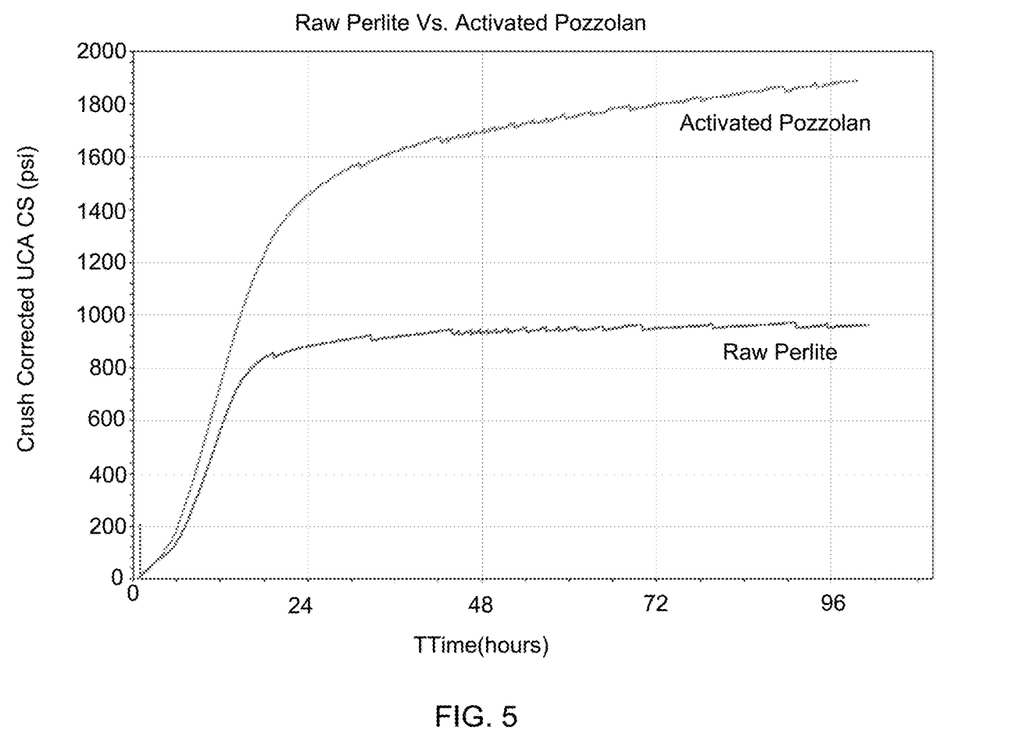
FIG. 5 is a graph of a crush corrected UCA of raw perlite versus activated pozzolan.

It can be observed from FIG. 5 and Table 6 that the slurry containing the activated pozzolan derived from raw perlite has a greater compressive strength than the slurry containing the raw perlite.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
   preparing a passivated cement solution by mixing cement grains and water, wherein the water is present in the passivated cement solution in an amount of about 400 wt % to 5000 wt. % of the cement grains, wherein the passivated cement solution comprises grains of cement hydration products formed by hydration of the cement grains, and wherein the grains of cement hydration products are dispersed in the water in the passivated cement solution,
   mixing at least a raw pozzolan and the passivated cement solution;
   reacting at least a portion of the raw pozzolan with the grains of cement hydration products in the passivated cement solution to produce an activated pozzolan comprising cement hydration products dispersed on a surface of the activated pozzolan;
   drying the activated pozzolan; and
   blending the activated pozzolan with a cement to form a dry blend.

2. The method of claim 1:
   wherein the water is present in an amount such that the prepassivated solution does not set to form a hardened mass.

3. The method of claim 2 wherein the cement grains comprise at least one cement selected from the group consisting of a Portland cement, a pozzolana cement, a gypsum cement, an alumina cement, a silica cements, and combinations thereof.

4. The method of claim 2 further comprising reacting the cement grains with the water to produce the cement hydration products in the passivated cement solution, wherein reacting the cement grains with the water is carried out at a temperature of about 5° C. to about 80° C.

5. The method of claim 2 further comprising wherein reacting the cement grains with the water to produce the cement hydration products in the passivated cement solution, wherein reacting the cement grains with the water is carried out for about 1 hour to about 24 hours.

6. The method of claim 1 wherein the cement hydration products comprise microcrystalline and/or nanocrystalline calcium silica hydrate.

7. The method of claim 6 wherein blending the activated pozzolan with a cement further comprises blending with at least of a supplementary cementitious material, a chemical additive, an inert additive.

8. The method of claim 1 wherein the cement hydration products comprise a carbonate.

9. The method of claim 1 wherein the cement hydration products comprise at least reacted cement grains.

10. The method of claim 1 wherein the raw pozzolan is selected from the group consisting of fly ash, volcanic ash, tuft, pumicites, metakaolin, silica fume, slag, lime ash, perlite, silicate glass, soda-lime glass, soda-silica glass, borosilicate glass, aluminosilicate glass, aplite, clays, calcined clays and combinations thereof.

11. The method of claim 1 wherein the cement comprises at least one cement selected from the group consisting of a Portland cement, a pozzolana cement, a gypsum cement, an alumina cement, a silica cements, and combinations thereof.

12. The method of claim 1 wherein the passivated cement solution further comprises a suspension agent.

13. The method of claim 1 wherein the passivated cement solution further comprises at least one suspension agent selected from the group consisting of bentonite, hydroxyethyl cellulose, carboxymethyl cellulose, carboxymethyl hydroxyethyl cellulose, and combinations thereof.

14. A composition comprising:
   a cement; and
   an activated pozzolan comprising cement hydration products dispersed on a surface of the activated pozzolan, wherein the cement hydration products are derived from reacting grains of cement hydration products dispersed in a passivated cement solution with a raw pozzolan to form the cement hydration products dispersed on a surface of the activated pozzolan, and wherein the passivated cement solution comprises the grains of cement hydration products and water in an amount of about 400 wt % 5000 wt. %;

wherein the cement and the activated pozzolan are a dry mixed powder.

15. The composition of claim 14 wherein the activated pozzolan comprises grains of cement hydration products disposed on a surface of a pozzolan, the grains of cement hydration products comprising at least one hydration product selected from the group consisting of microcrystalline calcium silica hydrate, nanocrystalline calcium silica hydrate, a carbonate, fully reacted cement grains, partially reacted cement grains, and combinations thereof.

16. The composition of claim 14 wherein the cement comprises at least one cement selected from the group consisting of a Portland cement, a pozzolana cement, a gypsum cement, an alumina cement, a silica cements, and combinations thereof.

17. The composition of claim 14 wherein the grains of cement hydration products are reaction products of water and at least one cement selected from the group consisting of a Portland cement, a pozzolana cement, a gypsum cement, an alumina cement, a silica cements, and combinations thereof.

18. The composition of claim 14 wherein the raw pozzolan is selected from the group consisting of fly ash, volcanic ash, tuft, pumicites, metakaolin, silica fume, slag, lime ash, perlite, silicate glass, soda-lime glass, soda-silica glass, borosilicate glass, aluminosilicate glass, aplite, clays, calcined clays, and combinations thereof.

19. The composition of claim 14 wherein the grains of cement hydration products comprise microcrystalline calcium silica hydrate.

20. The composition of claim 14 wherein grains of cement hydration products comprise carbonate.

* * * * *